W. SCOTT.
Hydrant.
No. 164,489. Patented June 15, 1875.
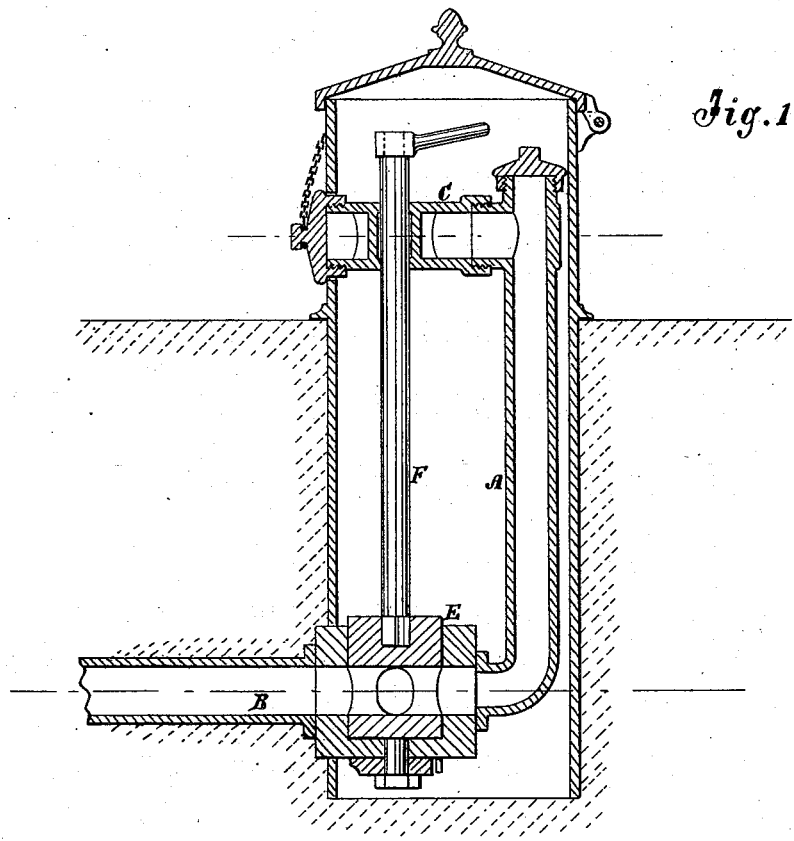
Fig. 1.
Fig. 2.
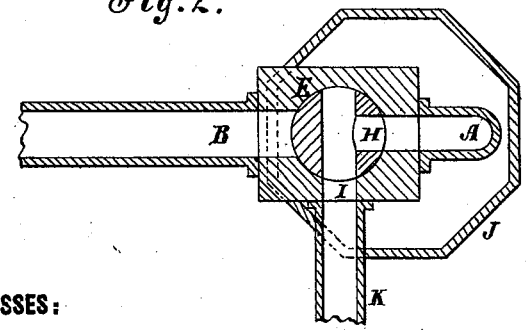
Fig. 3.
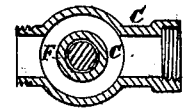
WITNESSES:
INVENTOR:
W. Scott
BY
ATTORNEYS.

UNITED STATES PATENT OFFICE.

WALTER SCOTT, OF PASSAIC, ASSIGNOR TO JOSEPH CHADWICK, OF BOILING SPRING, NEW JERSEY, AND HENRY DALE, OF NEW YORK CITY.

IMPROVEMENT IN HYDRANTS.

Specification forming part of Letters Patent No. 164,489, dated June 15, 1875; application filed March 29, 1875.

*To all whom it may concern:*

Be it known that I, WALTER SCOTT, of Passaic, in the county of Passaic and State of New Jersey, have invented a new and Improved Hydrant, of which the following is a specification:

The invention will first be described in connection with drawing, and then pointed out in the claim.

Figure 1 is a sectional elevation of my improved hydrant. Fig. 2 is a horizontal section of Fig. 1 on the line *x x;* and Fig. 3 is a horizontal section on line *y y.*

Similar letters of reference indicate corresponding parts.

A is the stand-pipe, B the branch connecting it with the main, and D the horizontal discharge-pipe at the top. E represents the plug-valve, which I propose to use arranged in the branch B, outside of the stand-pipe, with its stem F arranged in a hole, G, through the pipe C for its upper bearing. This arrangement enables me to utilize the extra passage H of a three-way cock for opening an escape-passage, I, which I also provide in the shell of the cock for opening when the main passage is closed, to let the water escape from the stand-pipe. Thus I get a waste-water passage for a hydrant, and means for opening and closing it much simpler and more reliable than has yet been contrived. In connection with this arrangement I extend the curb J down below the valve, to protect it from dirt, &c.; and to carry the waste water outside of it, I attach the pipe K in connection with the passage I.

Having thus described my invention, I claim as new and desire to secure by Letters Patent—

The combination, with branch B and escape I, of three-way cock E, provided with stem F, having its upper bearing in pipe C, as and for the purpose specified.

WALTER SCOTT.

Witnesses:
   T. B. MOSHER,
   ALEX. F. ROBERTS.